United States Patent [19]

Peres, deceased et al.

[11] Patent Number: 4,925,344

[45] Date of Patent: May 15, 1990

[54] METHOD AND APPARATUS FOR REPLACING BURIED PIPE

[76] Inventors: Steve U. Peres, deceased, late of La Porte; by Sara F. Peres, executrix, 10106 Avenue P., La Porte, both of Tex. 77571

[21] Appl. No.: 292,761

[22] Filed: Jan. 3, 1989

[51] Int. Cl.$^5$ .............................................. F16L 1/00
[52] U.S. Cl. ..................................... 405/184; 166/55; 166/55.7; 405/154
[58] Field of Search ....................... 405/154, 156, 184; 15/104.07, 104.02, 104.05, 104.08, 104.13, 104.15, 104.16; 166/55, 55.7, 54.5, 54.6; 30/92.5

[56] References Cited

U.S. PATENT DOCUMENTS

| | | | |
|---|---|---|---|
| 2,213,498 | 9/1940 | Kinzbach | 166/55.7 X |
| 2,498,756 | 2/1950 | Harris | 166/55.7 X |
| 2,528,300 | 10/1950 | Degner | 15/104.13 X |
| 3,039,530 | 6/1962 | Condra | 166/55 |
| 4,479,538 | 10/1984 | Coyle | 15/104.16 X |
| 4,507,019 | 3/1985 | Thompson | 405/154 |
| 4,553,877 | 11/1985 | Edvardsen | 405/154 |
| 4,738,565 | 4/1988 | Streatfield et al. | 405/154 |

FOREIGN PATENT DOCUMENTS

1265284 10/1986 U.S.S.R. .............................. 166/55.7

Primary Examiner—Dennis L. Taylor
Attorney, Agent, or Firm—James L. Jackson & Assoc.

[57] ABSTRACT

A buried pipe replacement system incorporating an elongated tapered grinding head having a helical cutter element disposed about the periphery and extending substantially along the length thereof. The grinding head is also provided with fluid ejection ports, enabling drilling fluid/lubricant material to be ejected therefrom as the drilling head is rotated and moved linearly against the buried existing pipe. The pipe grinding operation reduces the buried existing pipe to a pulverant form wherein the particulate resulting from grinding away the existing pipe forms a bedding composition lining at least the side and bottom portions of the resulting bore and thereby providing for optimum support of a replacement pipe which is towed into position within the bore simultaneously with the pipe grinding operation. A swivel connection allows rotation of the grinding head without inducing rotation to the replacement pipe following the grinding head. The grinding head is driven rotatably by the gear train of a power unit which imparts rotation to drill pipe extending from the power unit to the grinding head. Linear movement of the grinding head is induced by one or more hydraulic cylinders that impart linear movement to the power unit relative to a guide and support track on which the power unit is movably located.

20 Claims, 3 Drawing Sheets

METHOD AND APPARATUS FOR REPLACING BURIED PIPE

FIELD OF THE INVENTION

This invention relates generally to a method and apparatus for replacement of buried pipe and more specifically concerns a method for grinding away existing buried pipe and reducing it to a finely granulated or pulverant, particulate form such that the granulated remains of the existing pipe descend for the most part to the lower and side portions of the earth pipe bore originally occupied by the existing pipe. Grinding or cutting away the existing pipe is conducted simultaneously with replacement of the buried pipe with a replacement pipe of the same or larger internal diameter as compared to the buried pipe being replaced. Even more specifically, the present invention relates to apparatus that may be pushed, pulled or both pushed and pulled through the earth bore occupied by the existing pipe and at the same time is rotated to accomplish grinding or cutting away the existing pipe. Simultaneously, the apparatus moves a replacement pipe into the void or passage that is established by grinding away the existing pipe, which replacement pipe may have an internal bore as great or greater of the existing pipe.

BACKGROUND OF THE INVENTION

Although the present invention is related to pipe replacement in general, for purposes of simplicity, the invention is discussed herein particularly as it applies to replacement of conventional sewer pipe of the type employed in typical municipalities. The apparatus described herein is capable of grinding away or commutating most types of vitrious pipe, clay tile pipe, concrete pipe, and cast iron pipe.

Typically, sewer pipe is composed of interconnected joints of pipe composed of concrete, clay tile or metal, including cast iron, steel or ductile iron. Sections of utility pipe are typically provided with an enlarged bell at one end and a straight joining portion at the opposite end. Sections of utility pipe are placed in end-to-end relation with the straight portions thereof entering the enlarged bell of the adjacent pipe section. In the past it has been considered unnecessary to establish absolutely sealed joints when utility pipes are layed. Thus, a small amount of leakage is typical. Moreover, utility pipes, such as sewer pipes, are seldom maintained under any pressure and therefore leakage is restricted to a small amount of seepage at the pipe connections.

It has been found that utility pipes become deteriorated after having been buried for several years. It is now known that sewer gases cause deterioration of concrete material and also have an adverse effect on clay tile material and metal pipes. Upon deterioration of the pipe materials the pipes can become fractured due to shifting or settling of the earth and in some cases the joints are pulled apart, thereby allowing substantial leakage to occur at the pipe joints. It is desirable, therefore, to provide means for accomplishing replacement of utility pipes and to thereby restore the utility piping system to a substantially new condition.

In urban environments replacements of pipes such as water pipes, sewer pipes, etc. can be extremely difficult and expensive due to the presence of overlying structural features such as concrete sidewalks and driveways, tree roots, etc. In some cases, building structures may overly a buried pipe intended for replacement. It is desirable, therefore, to provide a procedure and apparatus for accomplishing efficient replacement of existing pipe such that structural features at the surface are not disturbed to any significant extent.

In many cases, the utility piping system of a municipality may have been initially established with relatively small diameter utility pipes. Additional fluid flow capacity may now be desired, such as to accommodate increased water usage or to provide for conversion of residential municipal areas for compact residential use or to provide for conversion of such areas to a large capacity commercial environment such as when large building structures or other commercialization is developed. To provide additional flow capacity needed for commercial sewer systems, it is frequently necessary to replace the entire piping system with larger pipe or to install pipes in parallel relation to the existing sewer systems. In such case excavation is usually required. It is desirable, therefore, to provide a process and apparatus for replacing existing pipes with pipes of larger dimension without significantly disturbing surface features.

Another disadvantage of conventional municipal utility systems is that the various pipe sections that are employed interfere with the efficiency of liquid flow. Each of the joints of the utility pipe in many cases constitute voids for deposit of sediment and create turbulence that interferes with efficient fluid flow. It is therefore desirable to provide a system for utility pipe replacement wherein the inside surface of the replacement pipe will be substantially free from surface discontinuities such as typically occurs in jointed utility pipe.

It has also been determined that leakage of sewage including liquid and gaseous materials into the surface earth formation can constitute severe health hazards such as pollution of surface water and shallow underground water. Leaked sewer gases can penetrate through the surface soil and collect in the residences and building structure to such extent that a health hazard becomes present. It is also desirable to provide a utility pipe replacement system wherein leak free replacement pipe is installed.

It is known that utility pipe can be fractured in situ by forcing a mandrel through existing pipe to fracture the existing pipe into multiple pipe fragments and to force the pipe fragments radially into the surrounding earth formation. In many cases the pipe fragments will be turned to present a sharp edge to the replacement pipe. Since the replacement pipe typically has a polymer composition, being formed of polyethylene, polypropylene or any one of a number of suitable polymer materials, it can be punctured or severely damaged by the sharp edges of the pipe fragments that occur as the result of a pipe fracturing operation. It is desirable, therefor, to provide a pipe replacement system wherein the existing pipe is ground to a finely comminuted form that becomes bedding material for the replacement pipe and which has no tendency to puncture or otherwise damage the replacement pipe.

THE PRIOR ART

Utility line replacement has long been a problem for municipalities. When a sewer line is in need of replacement or repair to prevent leakage of gas and liquid constituents, one convenient method for end-placed type rehabilitation has been a process typically known as "slip lining". Slip lining is typically accomplished simply by pushing or pulling a plastic pipe through an existing sewer line. In the even the sewer line is fractured or deviates from its normal grade, slip lining becomes a difficult task. Further, since plastic pipe is inserted into existing sewer line, the logical consequence is a reduction of the inside diameter of the pipe. Under circumstances where expansion of sewer line capacity is desired, the process of slip lining is ineffective. Existing pipe is also fractured in place by forcing an expansion mandrel through it with the pipe fragments there formed being forced into the surrounding soil. These pipe fragments can form sharp edges which can cut, puncture or otherwise damage the replacement pipe.

SUMMARY OF THE INVENTION

It is a primary feature of the present invention to provide a novel apparatus and method for utility pipe rehabilitation wherein existing utility pipe is ground in place by means of a rotatable tapered and fluted grinding head wherein the existing pipe is reduced to a finely comminuted form which functions as bedding material for replacement pipe.

It is also a feature of the present invention to provide a novel method and apparatus for utility pipe rehabilitation which permits replacement of existing pipe by means of a pipe having larger internal diameter than that of the pipe being replaced.

It is another feature of this invention to provide a novel method and apparatus for efficient pipe replacement wherein pipe grinding and pipe replacement occurs in a single pass as pipe replacement apparatus traverses the pipe being replaced.

It is an even further feature of this invention to provide a novel method and apparatus for pipe rehabilitation wherein line replacement operations may occur under road beds, sidewalks, and other surface features without damaging them in any way.

It is another feature of this invention to provide a novel method and apparatus for pipe replacement activities wherein long spans of existing pipe in the range of from about 800 feet to about 1200 feet may be replaced in a single pass of pipe removal and replacement apparatus along the length thereof.

It is also a feature of this invention to provide a novel method and apparatus for pipe rehabilitation wherein pipe replacement is achieved with minimum labor and low cost.

Other and further objects, advantages and features of the present invention will become apparent to one skilled in the art upon consideration of this entire disclosure. The form of the invention which will now be described in detail illustrates the general principals of the invention but it is to be understood that this detailed description is not to be taken as limiting the scope of the present invention.

Briefly, the novel aspects of the present invention are achieved by means of a jacking, boring or grinding and pipe replacement operation that occurs all in a single integral process. To accomplish utility line replacement, all sewer services are located and excavated. A pit is dug so that a pipe expanding and jacking machine can be positioned at the flow line grade of the existing utility pipe. A tapered fluted grinding head is provided for attachment to drill pipe such as 4 inch drill pipe similar to that utilized during drilling operations for oil wells. One end of the drill pipe is connected to apparatus for imparting rotary and linear movement to the drill pipe. At the opposite end of the pipe a tapered, fluted and lubricated grinding head is attached. As the drill pipe is moved linearly and rotated, the grinding head grinds the existing pipe to a finely comminuted form. Attached to the rear of the grinding head is a replacement pipe which is typically formed of any one of a number of plastic or polymer materials and is generally in the range of about 1 ¼ inches smaller than the grinding head. The replacement pipe is fixed in any suitable fashion to a swivel device that is provided on the grinding head. Accordingly, the replacement pipe does not rotate but is merely moved linearly as the grinding head is both rotated and moved linearly for grinding away the existing pipe. For efficiency of operations, the drill pipe and replacement pipe is provided in long sections (for example 20 foot sections) to thus minimize labor requirements as the replacement pipe is installed.

An engine powered hydraulic pipe rotating and jacking machine is employed which rotates the grinding head while simultaneously moving it linearly through the existing pipe. As the grinding head is thus moved linearly and rotatably through the existing pipe, the material from which the existing pipe is composed is ground to a finely comminuted form. The resulting particulate formed by this pipe grinding operation typically settles to the lower sides and bottom of the earth bore that results when the pipe grinding operation has been completed and forms a bedding composition for efficient support of the replacement pipe.

The tapered, fluted pipe grinding head defines at least one and preferably a plurality of lubricant ports. As the grinding head is rotated a liquid lubricant composition is pumped through the drill pipe to the grinding head and thence to the grinding interface between the grinding head and the pipe being replaced. This lubricant composition provides the grinding head with cooling and also serves to deposit a quantity of lubricant in the pipe replacement bore to thereby provide for lubrication of the replacement pipe. The replacement pipe will thus move readily through the lubricated bore as the grinding head traverses its course along the pipe being replaced.

An engine-powered hydraulic jacking machine is employed which rotates the grinding head while simultaneously moving it linearly through the existing pipe. As the grinding head is thus moved linearly and rotatably through the existing pipe, an earthen bore is provided which is bedded with the finely ground particulate that results as the existing pipe is ground away. Thus, the pipe grinding activity forms a lined bore with particulate lining or bedding material providing protection for the replacement pipe.

The jacking machine is mounted on a track that is located in the pit in generally parallel relation with the grade of the existing pipe. The track forms a plurality of spaced anchor abutments which receive anchor devices that are extended from a pusher block of the jacking machine. The jacking machine is capable of being anchored at various positions along the length of the track by the anchor means and functions to force the grinding head through the pipe being replaced by several increments of jacking movement. The cooperative relationship of the jacking machine and the track on which it moves enables long lengths of pipe to be inserted through the bore formed by grinding away the existing pipe. This is accomplished by several short increments of jacking movement with the jacking machine being moved relative to the track structure after each increment of jacking movement has been accomplished.

After a replacement pipe has been fully inserted, the jacking machine is released from the track, moved rearwardly to the initial jacking position thereof and new joints of drill pipe and replacement pipe are attached to again facilitate further jacking, rotation and pipe grinding operations. In this manner, long lengths up to 1200 feet of replacement pipe may be installed depending upon the characteristics of the soil in which the line being rehabilitated is buried. Depending upon soil conditions and the presence of obstacles in the line, there is a possibility of sewer line rehabilitation in the order of 100 feet per hour through the use of the method and apparatus of this invention.

As mentioned above, the pipe grinding head may be forced through the earth formation by pushing operations, pulling operations or by both pushing and pulling. It is convenient to provide a swiveled connector at the leading portion of the pipe grinding head to which a towing cable may be attached. The towing cable may be connected to the power apparatus of a winch truck or the like to thus apply a pulling force on the pipe grinding head as it traverses the pipe being ground away and replaced. This pulling force may be provided simply for the purpose of guiding the pipe grinding grade along the existing head so that the replacement pipe is located at the same grade as the pipe being replaced. The towing force thereby provides a guiding function to prevent the grinding head from deviating from the proper grade or direction as it traverses the existing pipe.

After replacement line installation has been completed in one direction, the jacking machine may be reversed on the track to thereby accomplish pipe replacement or rehabilitation in the opposite direction. Thus, extremely long lengths of replacement pipe may be installed from a single excavated pit. This feature also minimizes labor and expense during pipe replacement operations.

Pipe formed of various existing line materials such as concrete, clay tile and cast iron may be replaced in accordance with the principles set forth herein. In fact, any pipe material may be effectively replaced so long as the material is capable of being ground away by the grinding head as it traverses the line being replaced. There is no need to clear the pipeline easement of fences, trees and other surface features that have been located there during the span of years. In addition, where trench support is necessary for pipe replacement activities, the expense of trench support structure is held to a minimum with only a few points of excavation needed for this work. Where the lines are under pavement, the cost of the line rehabilitation will be maintained at a minimum since the surface features will not be disturbed.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

IN THE DRAWINGS

DETAILED DESCRIPTION OF PREFERRED EMBODIMENT

Figure 1:
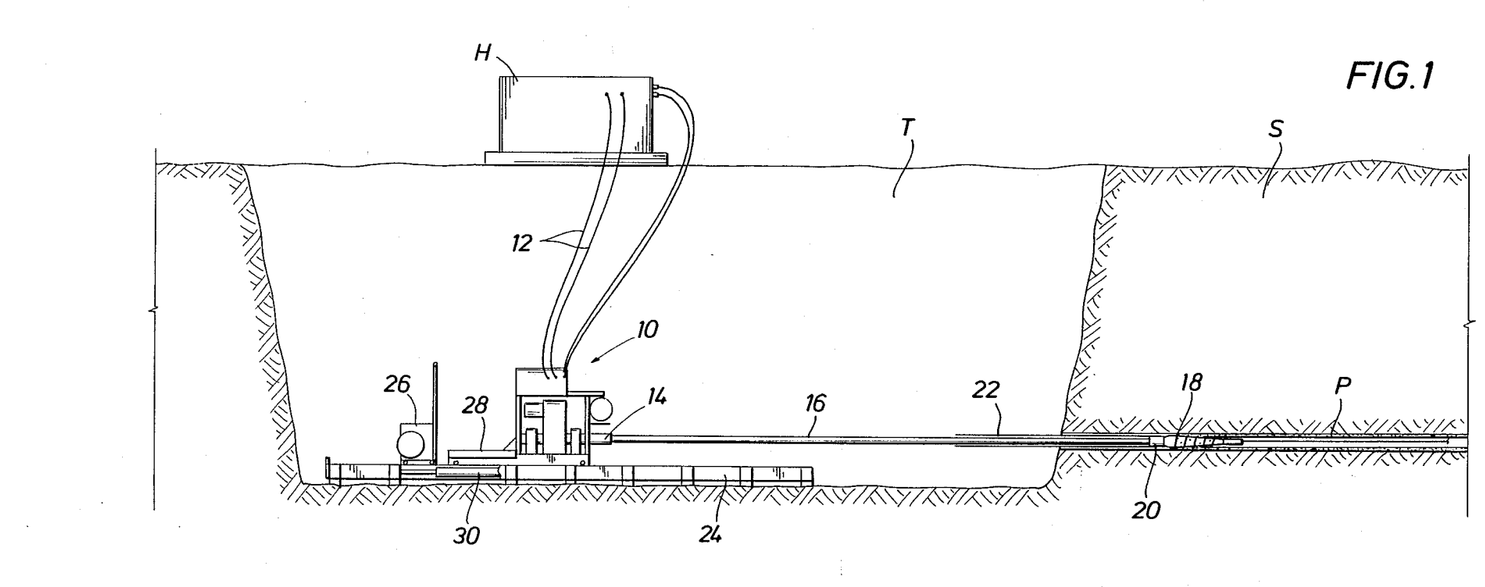
FIG. 1 is a pictorial representation of the pipe replacement apparatus of this invention being located for replacement of buried existing pipe.

Referring now to the drawings and first to FIG. 1, a cross-sectional pictoral representation illustrating a section of the surface formation S of the earth having a pipe P buried several feet below the surface. FIG. 1 also illustrates a pit or trench T which extends from the surface of the earth to a level below that of the grade of the pipe P for which replacement is desired. Within the trench T is located pipe replacement apparatus illustrated generally at 10 and being constructed in accordance with the teachings of this invention. The pipe replacement apparatus 10 incorporates a power unit receiving its power in the form of hydraulic energy from a surface based power source H which incorporates an engine driven hydraulic pumping system and suitable reservoirs for hydraulic fluid and drilling fluid/lubricant material. The hydraulic power source H is in power transmitting communication with the pipe replacement apparatus 10 by means of flexible hydraulic lines 12. The apparatus 10 imparts rotation to a drive shaft or stem 14 to which is connected one or more sections of drill pipe 16. At the free end of the drill pipe 16 is connected a tapered, fluted grinding head 18 which is rotated against the pipe being replaced in order to grind the pipe into a pulverant form. The pipe grinding head incorporates a swivel 20 to which is connected one or more sections of replacement pipe 22 which is pulled into the void or bore that remains after the existing pipe has been ground away. The swivel prevents the replacement pipe 22 from being rotated as the tapered grinding head is forced linearly and rotatably into the existing pipe.

The pipe replacement machine is supported in the trench T by means of an elongated track 24 which defines guide ways for movable components of the machine and also defines locking members which are selectively engaged by a force resisting stop device 26. The apparatus 10 also incorporates a movable slide structure which is mounted in guided relation with the track 24 and which is moved linearly relative to the stop member 26 by means of one or more hydraulic cylinders 30. As the slide 28 is moved linearly by the hydraulic cylinder pipe rotating apparatus, discussed in detail hereinbelow, is also moved linearly. Thus, the drill pipe 16 and the rotatable pipe grinding head 18 is moved both linearly and rotatably for grinding away the existing pipe.

Figure 5:
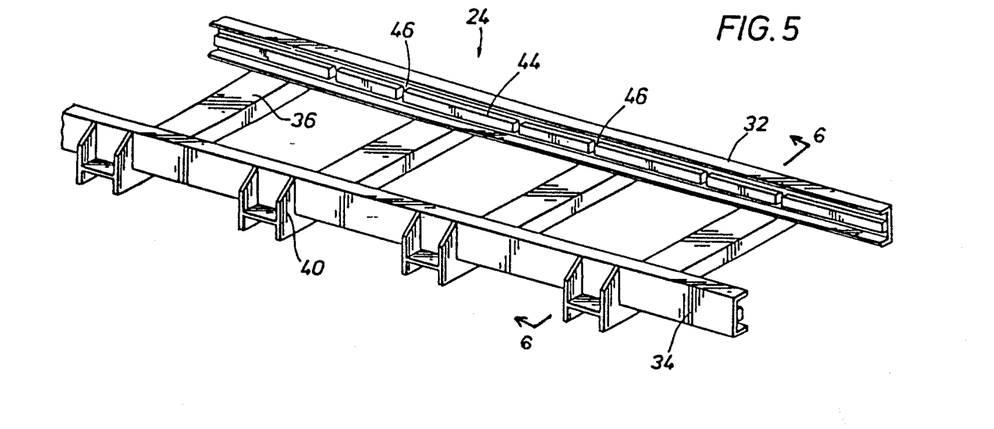
FIG. 5 is a partial isometric illustration of guide and support track structure of the apparatus of FIG. 2.
Figures 6, 7:
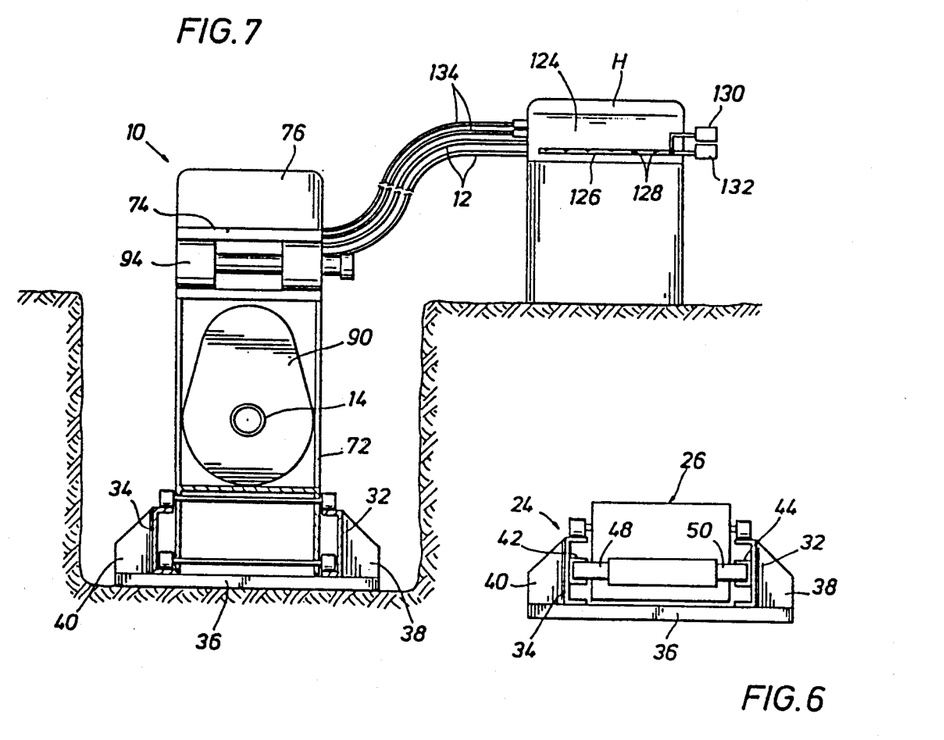
FIG. 6 is a sectional view taken along the line 6—6 of FIG. 5.
FIG. 7 is a sectional view taken along line 7—7 of FIG. 2 and illustrating the pipe replacement apparatus and its hydraulic power unit by way of an end view.

As shown in FIG. 5, the support track which is illustrated generally at 24 incorporates a pair of opposed side channels 32 and 34 with the upper and lower flanges thereof facing inwardly toward one another. The channel members 32 and 34 are secured in parallel relation by means of a plurality of transverse structural members 36 which are also in the form of C-shaped structural channels which are welded or otherwise secured to the guide channels 32 and 34. The structural interconnection between the guide channels 32 and 34 and the transverse structural channels 36 is enhanced by means of a plurality of gusset plates 38 and 40 which are welded both to the respective guide channels and to the transverse channels as is evident particularly in FIGS. 6 and 7. Intermediate the upper and lower flanges of each of the guide channels is located a plurality of locking members 42 and 44 that are in the form of a plurality of force transmitting and restraining blocks which are arranged to define locking spaces 46 therebetween. The restraining device 26 incorporates a plurality of opposed locking dogs 48 and 50 which are typically actuated hydraulically between a locking position as shown in FIG. 6 where the locking dogs are inserted into the spaces 46 between the locking members and a release position where the locking dogs are retracted from their locking engagement with the blocks 44. In this position the restraint device 26 is capable of establishing any one of a plurality of locked positions along the length of the track structure. The restraint device 26 also incorporates a winch 54 containing a length of wire rope having its free end secured to an end member 56 of the track structure 24. With the locking dogs of the restraining device released, the winch 54 is actuated for movement of the restraining device toward one end of the track structure. The restraining device is movable in the opposite direction by means of the hydraulic cylinders 30 or by any other suitable means. The restraining device 26 includes a guide body 58 disposed between the guide channels of the track structure 24. A pair of rollers or wheels 60 and 62 are mounted on the guide body and are received by the upper flanges of the parallel track members 32 and 34. The restraining device also incorporates appropriate hydraulic connections 64 having connected thereto hydraulic lines 66 to provide pressurized hydraulic fluid to the hydraulic cylinders 30. The hydraulic lines 66 are supported by means of a support post 68 which is pivotally mounted to the guide body 58. As the slide member 28 of the pipe replacement apparatus is moved linearly by the hydraulic cylinders the support post 68 will pivot while maintaining its support of the hydraulic lines 66. When the slide member has been moved to its full extent as determined by the stroke of the hydraulic cylinders 30, the hydraulic lines 66 will extend substantially straight from the restraining device to the connections of the slide member for the hydraulic cylinders.

The slide member 28 incorporates a structural framework having a plurality of vertical structural members such as shown at 70 and 72 to which are connected horizontal structural members 74. This structural framework provides support for an operational console 76 having a plurality of hydraulic valves 78 for operation thereof, which valves are controlled by means of a plurality of control levers 80. The structural framework also provides a protective enclosure for rotary drive apparatus located therein.

Figure 2:
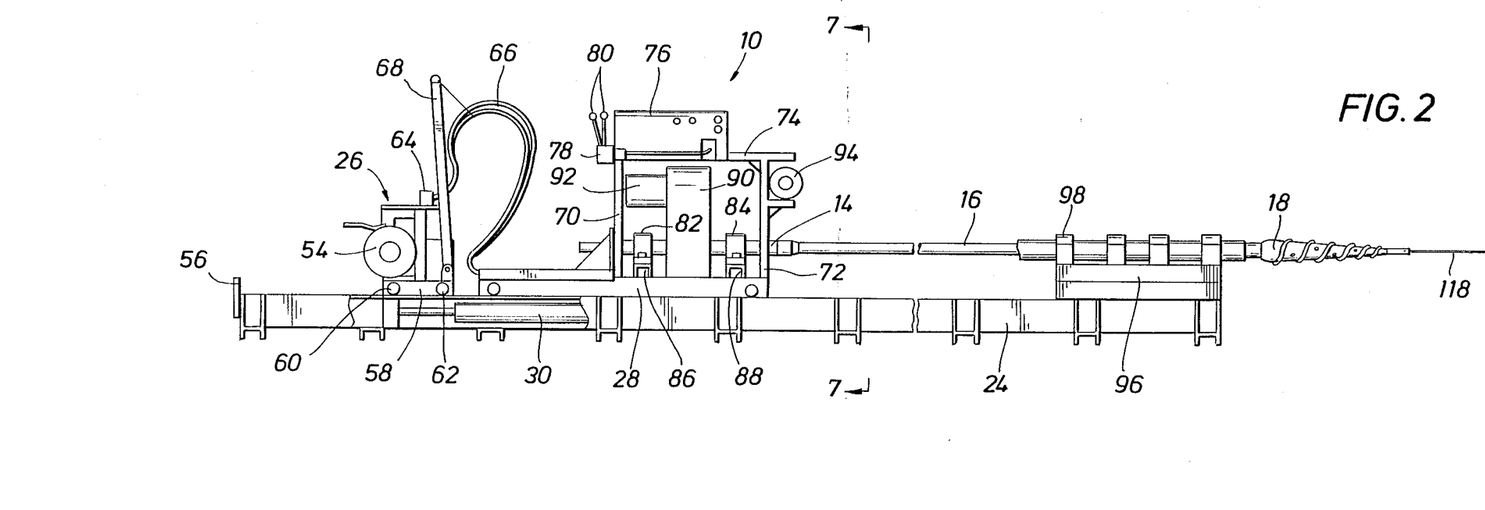
FIG. 2 is an elevational view of pipe replacement apparatus constructed in accordance with the present invention and having a portion thereof broken away and shown in section.

The rotary drive apparatus incorporates a pair of journals 82 and 84 which are supported by structural members 86 and 88 respectively which are in turn welded or otherwise fixed to the deck structure of the slide member 28. The journals 82 and 84 provide rotatable bearing support for the output drive shaft 14 of a suitable gear train located within a gear box 90. The gear train receives its power induced input by means of a hydraulic motor 92 that is supported on or adjacent to the gear box 90.

To provide for movement of the slide member 28 in a direction away from the restraining device 26 a second winch 94 is supported by the structural framework and is positioned such that its wireline may be connected to one extremity of the guide track. As the winch 94 is activated, its wireline causes the slide 28 to move to the right as shown in FIG. 2. The winches 54 and 94 may be utilized in conjunction with one another to accomplish incremental positioning of the restraining device and the slide structure of the pipe replacement apparatus relative to the track structure.

As shown at the right hand portion of FIG. 2 the track structure 24 is provided with a sealing station which is defined by a butt welding mechanism 96 having a plurality of releasable clamps 98. The butt welding mechanism is adapted to secure abutting ends of polymer pipe in abutting assembly. When the butt welding device 96 is activated, it first machines the end surfaces of the polymer pipe and positions the end surfaces in accurately abutting relation. The machine is then operative to supply sufficient heat for bringing the polymer material to its fusible state, whereupon fusion of the polymer pipe takes place, thereby establishing an efficient butt welded joint. This joint of the polymer pipe efficiently resists leakage, maintains efficient structural integrity to prevent separation of polymer pipe sections at the joint. The butt welded joints thus formed are substantially free of fluid turbulence, thereby allowing the pipeline formed thereby to have a greater flowing capacity as compared with typical jointed utility pipes.

The butt welding device 96 is commercially available; however, it is not heretofore been employed as a polymer pipe joining device in conjunction with a machine for accomplishing pipe replacement.

Figure 3:
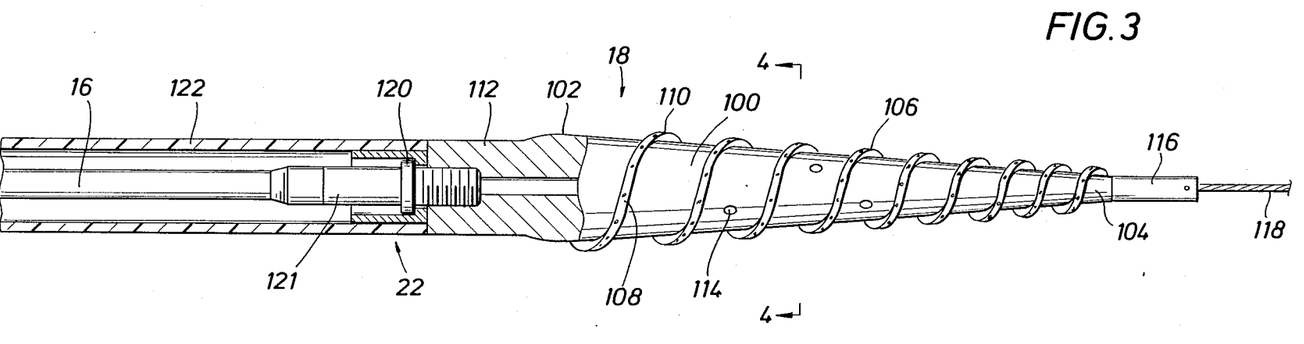
FIG. 3 is a side elevational view of the tapered rotary grinding head of the apparatus of FIG. 2 with a part thereof broken away to show the swivel of the grinding head in detail.

With reference particularly to the illustration of FIG. 3, the drill pipe 16 establishes driving connection at its free extremity with a conical fluted grinding head illustrated generally at 18 and having a body structure 100 having its largest dimension 102 at a location adjacent the driving connection between the drill pipe 16 and the body structure 100. The body of the drilling head 18 is tapered gradually from its large dimension 102 to a terminal extremity 104. A helical pipe grinding or cutting element 106 is welded or otherwise fixed to the tapered outer periphery of the body structure 100 and defines a sharp helical cutting edge 108 that enables efficient cutting or grinding of the pipe to be replaced. The helical grinder or cutter element 106 is composed of a very hard cutting material, typically metal or metal composite material such as tungsten carbide which will have efficient service life during pipe grinding operations. The helical cutter element may also be provided with a number of hardened buttons 110 which may be embedded in the outer periphery thereof and which function to enhance the pipe grinding operation.

Figure 4:
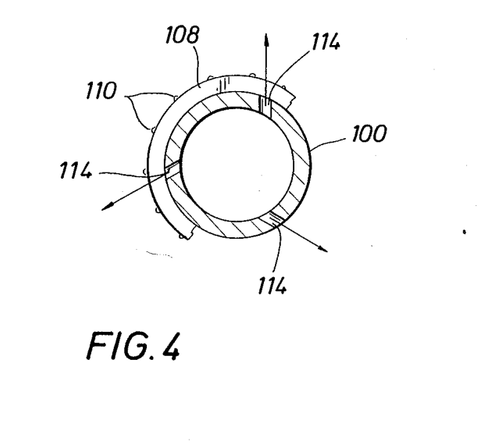
FIG. 4 is a sectional view taken along line 4—4 of FIG. 3.

The tapered body structure 100 of the grinding head forms an internal fluid passage 112 which receives lubricant fluid from the drill pipe 16. The passage 112 is intersected by a plurality of lubricant ports 114 which extend to the outer surface of the tapered grinding head. As shown in FIG. 4, the ports 114 are arranged to direct jets of lubricant material in a manner that is inclined with respect to the centerline of the grinding head. This feature enables lubricant fluid to be directed in a manner that is substantially tangential to the circular cross-section of the grinding head. This liquid lubricant composition is typically a combination of water and a detergent and it is provided for the purpose of cooling the grinding head and for insuring optimum grinding away of the pipe being replaced. Also, the lubricant material provides a lubricant coating in the bore formed by the grinding head and thus permits the replacement pipe to slide readily into place without significant friction.

The grinding head 100 is provided with a towing connection 116 at its small extremity which is adapted to receive a towing cable 118 to thus enable towing force to be applied to the grinding head as it is rotated and moved linearly by the drill pipe 16. The towing connection 116 is swivel mounted and thus does not rotate as the grinding head is rotated.

A replacement pipe connector 120 is swivel mounted on the grinding head and functions to provide for connection of one end of a replacement pipe 122 to the grinding head. Being swivel mounted, the connector 120 prevents rotation of the replacement pipe 122 while the grinding head is rotated and moved linearly by the drill pipe 16. Thus, the replacement pipe 122 is simply towed to the proper position within the bore that remains after the grinding head has ground away the existing pipe.

The remote power source H of the apparatus, as shown in FIGS. 1 and 7, will incorporate a drilling fluid/lubricant reservoir 124 containing a volume of fluid material. Within the reservoir 124 is provided a distribution plenum 126 having a plurality of openings 128 from which air and water is injected into the reservoir 124. The air and water or other fluid is obtained from appropriate air and water sources 130 and 132. As the mixture of air and water or other fluid is injected into the reservoir 124, it causes the reservoir to be maintained in a state of turbulence, thereby insuring that the drilling fluid is properly mixed at all times. A detergent or any other fluid composition that assists in the reduction of friction may be introduced along with the water from the source 132. One or more fluid distribution lines 134 extend from the hydraulic power source 134 to the apparatus 10 and are communicated with appropriate valve controlled flow conduit means for controlled introduction of the drilling fluid into the drill pipe 16. The operator of the pipe replacement apparatus will have the capability at the control console of controlling the volume of drilling fluid that is injected through the drill pipe 16 to the grinding head 18.

Figure 8:
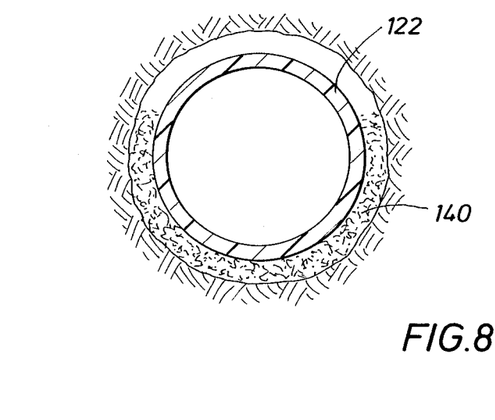
FIG. 8 is a cross-sectional view of installed replacement pipe illustrating bedding of the replacement pipe by the pulverant material resulting from grinding away the existing pipe.

The pipe replacement apparatus 10, as mentioned above, is located within the trench T at such grade that the grinding head 18 is located at the grade of the pipe to be replaced. The operator will then cause the restraining device 26 to become locked with respect to the track structure and thereafter will energize the hydraulic cylinder means 30, thereby causing the linear movement to be imparted to the slide 28. Simultaneously, the hydraulic motor 92 is energized, thereby driving the gear train 90 and thus causing the output shaft 14 to rotate the drill pipe to thus rotate the grinding head against the pipe to be replaced. The grinding head 18 will thus grind away the existing pipe and will leave a void or bore in its place which receives the replacement pipe 122 which is towed into place by the grinding head 18 by means of its swivel connection 120. As the grinding head 18 is rotated the helical cutter elements of the grinding head will cut or grind the existing pipe to a pulverant or particulate form whether the pipe to be replaced is in the form of concrete, clay tile, cast iron or any other material composition that is capable of being ground away by the grinding head. The pulverant or particulate material resulting from the grinding operation will settle to the bottom and side portions of the bore formed by the grinding head in the manner shown in FIG. 8. This pulverant material shown at 140 in FIG. 8 functions as a bedding composition insuring accurate positioning of the replacement pipe 122 relevant to the grade of the existing pipe. Further, the pulverant bedding composition 140 will have particulate of sufficiently small dimension that it will not tend to puncture or otherwise damage the replacement pipe. In fact, where the pipe to be replaced is of concrete composition, the pulverant bedding material 140 will have particulate of a dimension that does not substantially exceed the dimension of the largest aggregate material from which the concrete pipe is composed. During the pipe grinding operation the particulate bedding composition 140 will become saturated with the drilling fluid/lubricant material that is ejected from the grinding head. This activity will tend to wash the bedding material downwardly in the bore to thus cause it to fill virtually all of the space between the replacement pipe and the bore and to form an efficient bed for the replacement pipe.

In view of the foregoing, it is evident that the present invention is one well-adapted to obtain all of the objects and features hereinabove set forth together with other objects and features that are inherent from the method and apparatus described hereinabove.

While the foregoing is directed to the preferred embodiment, the scope thereof is determined by the claims which follow.

What is claimed is:

1. A method of replacing buried pipe with replacement pipe comprising:
    (a) locating pipe grinding and replacement apparatus in axial registry with the center line of the buried pipe to be replaced;
    (b) rotating and linearly moving a tapered pipe grinding head having a pipe cutting member thereon against the end of the buried pipe to be replaced, thereby completely grinding the pipe to be replaced to a pulverant character forming a pulverant bedding composition for the replacement pipe and forming a replacement pipe passage of a dimension exceeding the external dimension of the replacement pipe; and
    (c) extending a replacement pipe endwise into the replacement pipe passage simultaneously with grinding away the buried pipe.

2. A method as recited in claim 1 wherein said method steps of paragraphs (b) and (c) are accomplished in a single pass of said tapered pipe grinding head through the earth bore occupied by said buried pipe.

3. The method recited in claim 1, wherein:
said tapered pipe grinding head is forcibly moved against the end of the buried existing pipe by simultaneous linear and rotational components of movement.

4. The method recited in claim 1, wherein:
said pipe grinding head is moved through said pipe by a pushing force.

5. The method recited in claim 1, wherein:
said pipe grinding head is moved against said existing pipe by a pulling force.

6. The method recited in claim 1, wherein:
said pipe grinding head is moved against said existing pipe by both pushing and pulling forces.

7. The method of claim 1, including:
injection of drilling fluid/lubricant material from said grinding head during rotation and linear movement of said grinding head against said existing pipe, thereby cooling said grinding head and reducing frictional movement of said replacement pipe into said passage.

8. The method of claim 1, wherein:
said tapered drilling head defines helical cutter means extending along the length of said grinding head, said helical cutter means being rotated against said existing pipe by said grinding head thus reducing said existing pipe to said pulverant form.

9. The method of claim 1, wherein:
said pulverant material resulting from grinding away said existing pipe includes particulate having a maximum dimension not substantially exceeding the dimension of aggregate in the composition of said existing pipe.

10. Apparatus for grinding existing buried pipe to a pulverant form and replacing the existing buried pipe with a replacement pipe having a dimension equaling or exceeding the dimension of the existing buried pipe, comprising:
(a) an elongated, tapered grinding head having spiral pipe cutter means along the length thereof for engaging and grinding said existing pipe to a pulverant form, said pipe grinding head having a small dimension at its leading extremity of smaller dimension than the internal dimension than said existing pipe and a large dimension at its trailing extremity being of a dimension exceeding that of said existing pipe;
(b) means for imparting linear and rotational movement to said pipe grinding head against the end of said buried existing pipe for grinding thereof by said spiral pipe cutter means; and
(c) connector means mounted at said trailing extremity of said pipe grinding head and adapted for connection with the leading end of said replacement pipe and being operative to tow said replacement pipe into position within the bore formed by said grinding head simultaneously with said grinding of said existing pipe.

11. The apparatus of claim 10, wherein:
said means for moving said tapered pipe grinding head against said buried existing pipe comprises means for applying a pushing force to said pipe grinding head.

12. The apparatus of claim 10, wherein:
said means for moving said tapered pipe grinding head against said buried existing pipe comprises means for applying a pulling force to said pipe grinding head.

13. The apparatus of claim 10, wherein:
said means for moving said tapered pipe grinding head against said buried existing pipe induces simultaneous linear and rotary movement to said pipe grinding head.

14. The apparatus of claim 10, wherein:
said tapered grinding head defines a tapered, substantially helical cutter element extending about the outer periphery thereof throughout substantially the entire length of said tapered grinding head, said helical cutter engaging the end surface of said pipe and grinding away said buried existing pipe upon rotation and linear movement thereof against said buried existing pipe.

15. The apparatus of claim 10, wherein:
(a) said existing pipe is composed of material including aggregate; and
(b) a plurality of hardened projections extend from the outer periphery of said helical cutter element and assist in cutting and grinding activity for reduction of said buried existing pipe to a pulverant form having a particle dimension not substantially exceeding the dimension of aggregate in the composition of said existing pipe.

16. The apparatus of claim 10, wherein said connector means comprises:
(a) a swivel mount extending from said trailing extremity of said grinding head and adapted for establishment of a driven, non rotatable swivel connection with drill pipe forming a component of said means for moving said pipe grinding head against said buried existing pipe; and
(b) a swivel element being received by said swivel mount and having rotatable relation therewith, said swivel connection being adapted to receive said replacement pipe in towing relation therewith.

17. The apparatus of claim 10, wherein said means for moving said grinding head against said buried existing pipe comprises:
(a) elongated support track means adapted for location in substantial parallel relation with the grade of said buried existing pipe, said track means defining spaced abutment means;
(b) jacking means being movably supported by said track means and having force transmitting relation with said abutment means; and
(c) elongated rigid force transmitting means interconnecting said jacking means and said pipe grinding head.

18. The apparatus of claim 17, wherein said jacking means comprises:
(a) a power system driven by motor means, said power system imparting rotary movement to said rigid force transmitting means and said pipe grinding head;
(b) restraining means having abutment engagement means; and
(c) linear hydraulic motor means interconnecting said power system and said restraining means and, when energized, imparting linear movement to said power system relative to said track means and thus imparting linear movement to said rigid force transmitting means and said pipe grinding head.

19. The apparatus of claim 18, wherein said linear hydraulic motor means imparts a pushing movement to said restraining means to impart linear movement to said power system relative to said track means.

20. The apparatus of claim 10, wherein:

said tapered grinding head defines an internal passage receiving drilling fluid/lubricant composition from said means for moving said pipe grinding head against said buried existing pipe, said tapered grinding head further defining a plurality of ports extending from the outer surface of said grinding head to said passage means, whereby drilling fluid/lubricant material is ejected from said ports during rotation and linear movement of said tapered grinding head against said buried existing pipe.

* * * * *